US011350308B2

(12) United States Patent
Jang et al.

(10) Patent No.: US 11,350,308 B2
(45) Date of Patent: May 31, 2022

(54) METHOD AND APPARATUS FOR TRANSMITTING BUFFER STATUS REPORT IN WIRELESS COMMUNICATION SYSTEM

(71) Applicant: Samsung Electronics Co., Ltd., Gyeonggi-do (KR)

(72) Inventors: Jaehyuk Jang, Gyeonggi-do (KR); Anil Agiwal, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/586,353

(22) Filed: Sep. 27, 2019

(65) Prior Publication Data

US 2020/0107219 A1 Apr. 2, 2020

(30) Foreign Application Priority Data

Sep. 28, 2018 (KR) .................. 10-2018-0116388

(51) Int. Cl.
| | | |
|---|---|---|
| *H04W 28/02* | (2009.01) | |
| *H04W 28/06* | (2009.01) | |
| *H04W 72/12* | (2009.01) | |
| *H04W 74/08* | (2009.01) | |
| *H04W 76/27* | (2018.01) | |

(52) U.S. Cl.
CPC ....... *H04W 28/0278* (2013.01); *H04W 28/06* (2013.01); *H04W 72/1268* (2013.01); *H04W 74/0833* (2013.01); *H04W 76/27* (2018.02)

(58) Field of Classification Search
None
See application file for complete search history.

(56) References Cited

U.S. PATENT DOCUMENTS

| | | | | |
|---|---|---|---|---|
| 2010/0255850 | A1* | 10/2010 | Kaukoranta | ...... H04W 72/1268 455/450 |
| 2012/0134305 | A1* | 5/2012 | Damnjanovic | ....... H04L 5/0053 370/280 |
| 2015/0117342 | A1* | 4/2015 | Loehr | ............... H04W 72/1289 370/329 |

(Continued)

FOREIGN PATENT DOCUMENTS

| | | |
|---|---|---|
| KR | 20170142177 | 12/2017 |
| WO | WO 2015/065039 | 5/2015 |
| WO | WO 2015/178566 | 11/2015 |

OTHER PUBLICATIONS

Ericsson, "Open Issues for Scheduling Request", R2-1713480, 3GPP TSG-RAN WG2 #100, Nov. 27-Dec. 1, 2017, 8 pages.

(Continued)

*Primary Examiner* — Ajit Patel
*Assistant Examiner* — Liem H. Nguyen
(74) *Attorney, Agent, or Firm* — Ths Farrell Law Firm, P.C.

(57) ABSTRACT

A method of transmitting a buffer status report (BSR) of a user equipment includes triggering a procedure for a BSR corresponding to a predefined logical channel; determining whether a resource for transmitting a scheduling request corresponding to the predefined logical channel is allocated; identifying whether a configured uplink resource is allocated, based on a result of determining whether the resource for transmitting the scheduling request is allocated; and when the configured uplink resource is allocated, determining whether to transmit the BSR by using the configured uplink resource.

12 Claims, 9 Drawing Sheets

(56) References Cited

U.S. PATENT DOCUMENTS

| | | |
|---|---|---|
| 2015/0373678 A1 | 12/2015 | Chou et al. |
| 2018/0270700 A1* | 9/2018 | Babaei ............... H04W 72/1284 |
| 2018/0324872 A1* | 11/2018 | Babaei ................ H04W 72/042 |
| 2018/0368160 A1* | 12/2018 | Kunt ................. H04W 72/1268 |
| 2019/0075588 A1* | 3/2019 | Dudda .................. H04W 24/10 |
| 2019/0124677 A1 | 4/2019 | Kim et al. |
| 2019/0174513 A1* | 6/2019 | Loehr ............... H04W 72/1268 |
| 2020/0163122 A1* | 5/2020 | Lee ................... H04W 72/1284 |
| 2020/0178275 A1* | 6/2020 | Shao .................... H04W 74/004 |
| 2020/0196327 A1* | 6/2020 | Zhang ............... H04W 72/1284 |
| 2021/0136793 A1* | 5/2021 | Jiang ................... H04W 72/042 |

OTHER PUBLICATIONS

Samsung Electronics R&D Institute UK, "Handling Absence of SR Resource in NR", R2-1710337, 3GPP TSG-RAN WG2 #99-Bis, Oct. 9-13, 2017, 3 pages.
Lenovo, Motorola Mobility, "Scheduling Request Procedure", R2-1800681, 3GPP TSG-RAN WG2 NR AH#1, Jan. 22-26, 2018, 3 pages.
International Search Report dated Jan. 3, 2020 issued in counterpart application No. PCT/KR2019/012385, 11 pages.
Ericsson, "Message 3.5 in LTE Connected to 5GC", R2-1806844, 3GPP TSG-RAN WG2 #102, May 21-25, 2018, 4 pages.
European Search Report dated Sep. 9, 2021 issued in counterpart application No. 19864208.4-1215, 9 pages.

* cited by examiner

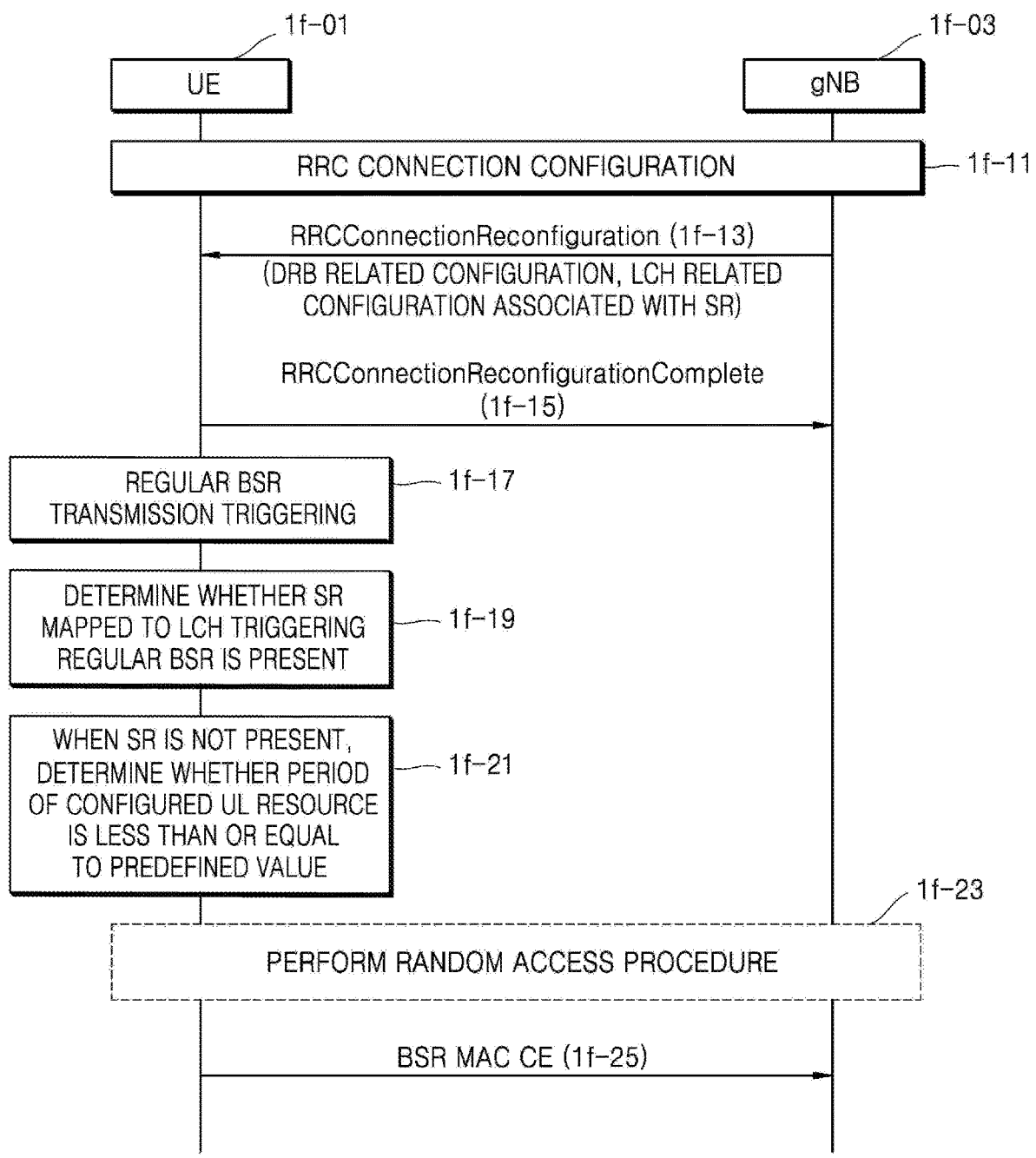

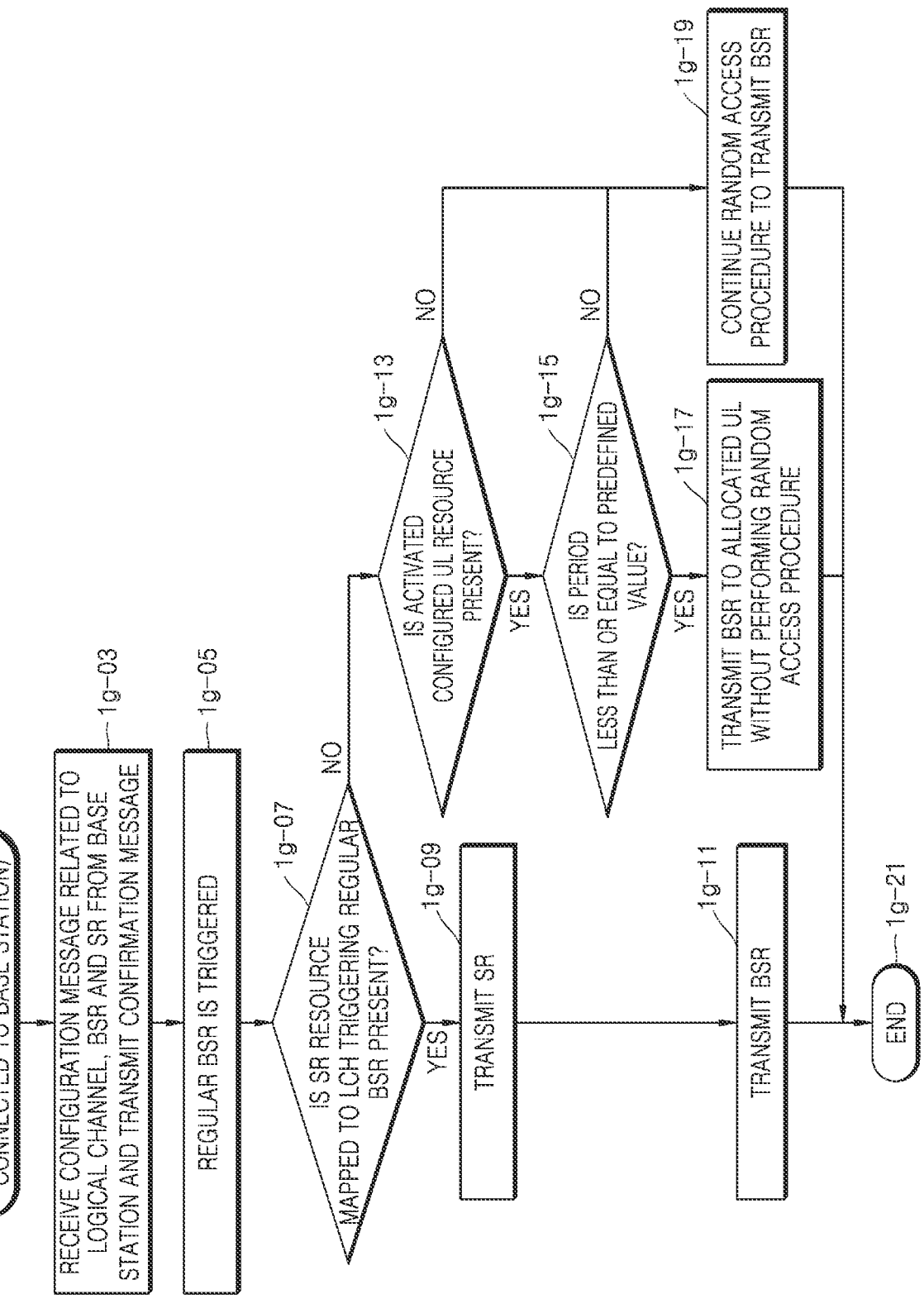

METHOD AND APPARATUS FOR TRANSMITTING BUFFER STATUS REPORT IN WIRELESS COMMUNICATION SYSTEM

CROSS-REFERENCE TO RELATED APPLICATION(S)

This application is based on and claims priority under 35 U.S.C. 119 to Korean Patent Application No. 10-2018-0116388, filed on Sep. 28, 2018, in the Korean Intellectual Property Office, the disclosure of which is incorporated by reference herein in its entirety.

BACKGROUND

1. Field

The present disclosure relates generally to a method by which a user equipment requests a transmission resource so as to transmit data in a wireless communication system.

2. Description of Related Art

To meet the increase in demand with respect to wireless data traffic after the commercialization of $4^{th}$ generation (4G) communication systems, considerable efforts have been made to develop enhanced $5^{th}$ generation (5G) or pre-5G communication systems. This is one reason why "5G communication systems" or "pre-5G communication systems" are called "beyond 4G network communication systems" or "post long-term evolution (LTE) systems." In order to achieve a high data transmission rate, 5G communication systems are being developed to be implemented in a super-high frequency band (millimeter wave (mmWave)), e.g., a band of 60 GHz. In order to reduce the occurrence of stray electromagnetic waves in such a super-high frequency band and to increase a transmission distance of electromagnetic waves in 5G communication systems, various technologies are being studied, such as beamforming, massive multiple input multiple output (MIMO), full dimensional MIMO (FD-MIMO), array antennas, analog beam-forming, and large scale antennas. In order to improve system networks for 5G communication systems, various technologies have been developed, e.g., evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid modulation of frequency-shift keying (FSK) and quadrature amplitude modulation (QAM) (FQAM), sliding window superposition coding (SWSC), which are advanced coding modulation (ACM) schemes and filter bank multi carrier (FBMC), non-orthogonal multiple access (NOMA), and sparse code multiple access (SCMA), which are advanced access schemes.

The Internet has evolved to the Internet of things (IoT), where distributed configurations, such as objects, exchange information with each other to process the information. Internet of everything (IoE) technology is being newly provided, in which technology related to the IoT is combined with, for example, technology for processing big data by connecting with a cloud server. In order to implement the IoT, various technical components are required, such as, a sensing technique, wired/wireless communication and network infrastructures, a service interfacing technique, or a security technique. In recent years, techniques including a sensor network for connecting objects, machine to machine (M2M) communication, or machine type communication (MTC) have been studied. In the IoT environment, intelligent Internet technology services may be provided to collect and interpret data obtained from objects connected to each other and thus to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, or high quality medical services.

Various attempts are being made to apply 5G communication systems to the IoT network. For example, technologies related to sensor networks, M2M communication, or MTC are implemented by using 5G communication technology including beam-forming, MIMO, or array antenna. The application of the cloud RAN as a big data processing technique described above may be an example of convergence of the 5G communication technology and the IoT technology.

With the development of wireless communication systems, various services are now capable of being provided, and thus, ways of effectively processing a resource allocation request and a random access procedure of a user equipment are required.

SUMMARY

The present disclosure has been made to address the above-mentioned problems and disadvantages, and to provide at least the advantages described below. In accordance with an aspect of the disclosure, a method of transmitting a buffer status report (BSR) of a user equipment includes triggering a procedure for a BSR corresponding to a predefined logical channel; determining whether a resource for transmitting a scheduling request corresponding to the predefined logical channel is allocated; identifying whether a configured uplink resource is allocated, based on a result of the determination of whether the resource for transmitting the scheduling request is allocated; and determining whether to transmit the BSR by using the configured uplink resource when the configured uplink resource is allocated.

In accordance with another aspect of the present disclosure, a method of receiving a BSR of a base station includes transmitting, to user equipment, a configuration message for at least one of a predefined logical channel, a BSR, or a scheduling request; determining whether the scheduling request is received from the user equipment; and receiving the BSR by using an uplink resource allocated to the user equipment, or receiving the BSR through a random access procedure with the user equipment, based on a result of the determination of whether the scheduling request is received from the user equipment.

In accordance with another aspect of the present disclosure, a user equipment for transmitting a BSR includes a transceiver, and at least one controller coupled with the transceiver and configured to trigger a procedure for a BSR corresponding to a predefined logical channel; determine whether a resource for transmitting a scheduling request corresponding to the predefined logical channel is allocated; identify whether a configured uplink resource is allocated, based on a result of the determination of whether the resource for transmitting the scheduling request is allocated;

and when the configured uplink resource is allocated, determine whether to transmit the BSR by using the configured uplink resource.

In accordance with another aspect of the present disclosure, a base station for receiving a BSR includes a transceiver, and at least one controller connected to the transceiver and configured to transmit, to a user equipment, a configuration message for at least one of a predefined logical channel, a BSR, or a scheduling report; determine whether the scheduling request is received from the user equipment; and receive the BSR by using an uplink resource allocated to the user equipment, or receive the BSR through a random access procedure with the user equipment, based on a result of the determination of whether the scheduling request is received from the user equipment.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1F illustrates an example of a message flow between a UE and a gNB during UL data transmission, according to an embodiment;

FIG. 1G illustrates an example of an operation sequence of a UE during UL data transmission, according to an embodiment;

DETAILED DESCRIPTION

Figure 1A:
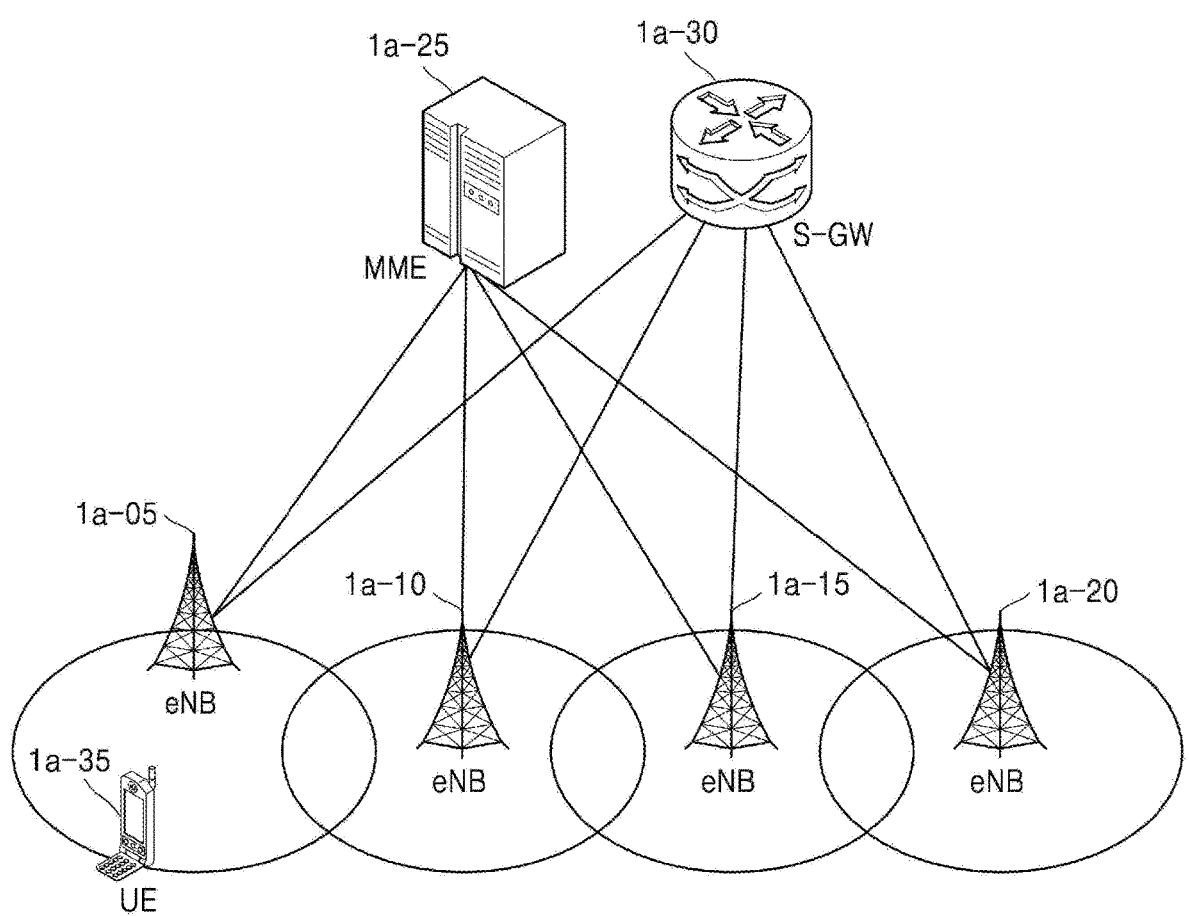
FIG. 1A is a diagram illustrating a configuration of an LTE system, according to an embodiment.

Provided is a method by which a user equipment transmits a BSR so as to transmit data in a wireless communication system.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

As used herein, the expressions "A or B", "at least one of A and B", "at least one of A or B", "one or more of A and B", and "one or more of A or B" may include any and all combinations of one or more of the associated listed items. Terms such as "A or B", "at least one of A and B", or "at least one of A or B" may refer any and all of the cases where at least one A is included, where at least one B is included, or where both of at least one A and at least one B are included.

As used herein, a controller may also be referred to as a processor.

As used herein, a layer (or a layer apparatus) may also be referred to as an entity. It will be understood that each block of a flowchart or drawing and a combination of the blocks in a flowchart or drawing may be performed by computer program instructions. Because these computer program instructions may be embedded in a processor of a general purpose computer, a special purpose computer, or other programmable data processing apparatuses, the instructions executed through the processor of the computer or other programmable data processing apparatuses generate units configured to perform the functions described in the flowchart block(s). Because these computer program instructions may also be stored in a computer-usable or computer-readable memory that may direct a computer or other programmable data processing apparatuses so as to implement functions in a particular manner, the instructions stored in the computer-usable or computer-readable memory are also capable of producing an article of manufacture including instruction units configured to perform the functions described in the flowchart block(s). Because these computer program instructions may also be loaded into the computer or other programmable data processing apparatuses, the instructions for operating the computer or other programmable data processing apparatuses by generating a computer-executed process when a series of operations are performed in the computer or other programmable data processing apparatuses may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, terms having the expression "-or/er" (i.e., words ending in "or" or "er") in the embodiments of the disclosure means a software component or hardware component such as a field-programmable gate array (FPGA) or an application-specific integrated circuit (ASIC) that performs a specific function. However, terms having the expression "-or/er" are not limited to software or hardware. The terms having the expression "-or/er" may be formed so as to be in an addressable storage medium, or may be formed so as to operate one or more processors. Thus, for example, the terms having the expression "-or/er" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables.

A function provided by the components may be associated with a smaller number of components, or may be divided into additional components. Furthermore, the components may be embodied to reproduce one or more central processing units (CPUs) in a device or security multimedia card. Also, components associated with terms ending in the expression "-or/er" may include at least one processor.

As used herein, terms for identifying access nodes, referring to network entities, referring to messages, referring to interfaces between network entities, and referring to a variety of identification information are only for convenience of description. Accordingly, the disclosure is not limited to the terms described below, and other terms may be used to refer to objects having equivalent technical meanings. For example, the term "terminal" as used herein may refer to a media access control (MAC) entity in a terminal that exists for each master cell group (MCG) and secondary cell group (SCG), which will be described below.

Terms and names defined in the 3rd Generation Partnership Project LTE (3GPP LTE) standard are used herein. However, the disclosure is not limited to these terms and names, and may be equally applied to systems conforming to other standards.

As used herein, a base station performs resource allocation of a terminal, and may be at least one of gNode B, eNode B, Node B, base station (BS), a radio access unit, a base station controller, a node on a network. The terminal may include a user equipment (UE), a mobile station (MS), a cellular phone, a smartphone, a computer, or a multimedia system capable of performing a communication function.

The disclosure may be applied to 3GPP new radio (NR) (5th generation mobile communication standard). The disclosure may also be applied intelligent services (e.g., smart home, smart building, smart city, smart or connected car, healthcare, digital education, retail, security, or safety related services) based on 5G communication technology IoT related technology. The term "eNB" may be used interchangeably with gNB for convenience of description. That is, the BS described as eNB may represent gNB. The term "UE" may also refer to other wireless communication devices as well as mobile phones, narrowband (NB)-IoT devices, and sensors.

A wireless communication system has evolved from providing initial voice-oriented services to, for example, a broadband wireless communication system providing a high-speed and high-quality packet data service, such as communication standards of high speed packet access (HSPA), LTE or evolved universal terrestrial radio access (E-UTRA), LTE-A, LTE-Pro, high rate packet data (HRPD) of 3GPP2, ultra mobile broadband (UMB), and Institute of Electrical and Electronics Engineers (IEEE) 802.16e.

In an LTE system, as a representative example of the broadband wireless communication system, an orthogonal frequency division multiplexing (OFDM) scheme is used in a downlink (DL) and a single carrier frequency division multiplexing (SC-FDMA) scheme is used in an uplink (UL). The UL refers to a radio link through which a terminal, UE, or an MS transmits data or control signals to a BS or gNode B, and the DL refers to a radio link through which a BS transmits data or control signals to a UE. In such a multiple access scheme, data or control information of each user is classified by assigning and operating the data or control information such that time-frequency resources for transmitting data or control information for each user do not overlap each other, that is, such that orthogonality is established.

5G communication systems should be able to freely reflect various requirements of users and service providers, and therefore, services that satisfy various requirements at the same time must be supported. Services considered for 5G communication systems include enhanced mobile broadband (eMBB), massive machine type communication (mMTC), and ultra reliability low latency communication (URLLC).

The eMBB may aim to provide a data transmission rate that is higher than that of the existing LTE, LTE-A, or LTE-Pro. For example, in the 5G communication systems, the eMBB should be able to provide a peak data rate of 20 gigabits per second (Gbps) in a DL and a peak data rate of 10 Gbps in a UL in terms of a single BS. Also, the 5G communication systems should be able to provide an improved peak transmission rate, and at the same time, provide an increased user perceived data rate of a UE. In order to meet such requirements, the 5G communication systems may require improvements of various transmission and reception technologies, including further improved multi input multi output (MIMO) transmission technology. Also, while the current LTE uses signals that are transmitted by using a transmission bandwidth of up to 20 MHz in a band of 2 GHz, the 5G communication systems use a frequency bandwidth that is greater than 20 MHz in a frequency band of 3 GHz to 6 GHz or 6 GHz or more, thereby satisfying a data transmission rate required by the 5G communication systems.

At the same time, the 5G communication systems take mMTC into account so as to support application services such as IoT. In order to efficiently provide IoT, the mMTC may require the access support of large-scale terminals in a cell, the improved coverage of the UE, the improved battery time, and the reduced cost of the UE. Because IoT is attached to various sensors and devices to provide a communication function, IoT must be able to support a large number of terminals (e.g., 1,000,000 terminals/kilometer squared ($km^2$)) in a cell. Because the UE supporting mMTC is highly likely to be located in a shadow area that the cell does not cover, such as a basement of a building, due to characteristics of services, a coverage wider than those of other services provided by the 5G communication systems may be required. The UE supporting mMTC needs to be configured by using an inexpensive UE. Because it is difficult to replace a battery of the UE frequently, a battery with a very long life (10 years to 15 years) may be required.

Finally, URLLC may be used for a cellular-based wireless communication service for mission-critical purposes, such as remote control of a robot or machinery, industrial automation, unmanned aerial vehicle applications, remote healthcare applications, and an emergency alert. Therefore, a communication provided by URLLC may have to provide very low latency (ultra-low latency) and very high reliability (super reliability). For example, a service supporting URLLC must satisfy an air interface latency of less than 0.5 milliseconds, and at the same time, may have a requirement of a packet error rate (i.e., packets lost per second) of 10 to 5 or less. Therefore, in order to provide a service supporting URLLC, 5G systems must provide a transmit time interval (TTI) smaller than those of other services. At the same time, in order to secure reliability of communication links, a design matter for allocating a wide resource in a frequency band may be required.

Three services considered in the above-described 5G communication system, eMBB, URLLC, and mMTC, may be multiplexed and transmitted in a single system. In this case, different transmission and reception techniques and parameters may be used between services so as to satisfy different requirements of the respective services. However, mMTC, URLLC, and eMBB are merely examples of different service types, and the service types to which the disclosure is to be applied are not limited to the above-described examples.

In addition to the 3GPP LTE standard, the disclosure may be applied to 3GPP NR (5th generation mobile communication standard). In addition, embodiments of the disclosure may be applied to other communication systems having a similar technical background or channel form. Furthermore, embodiments of the disclosure may be applied to other communication systems through some modifications without departing from the scope of the disclosure, as determined by those of ordinary skill in the art.

FIG. 1A is a diagram illustrating a configuration of an LTE system according to an embodiment.

Referring to FIG. 1A, the LTE system includes a plurality of eNBs 1a-05, 1a-10, 1a-15, and 1a-20, a mobility management entity (MME) 1a-25, and a serving-gateway (S-GW) 1a-30. UEs (or terminals) 1a-35 may access an external network through the plurality of eNBs 1a-05, 1a-10, 1a-15, and 1a-20 and the S-GW 1a-30.

The plurality of eNBs 1a-05, 1a-10, 1a-15, and 1a-20 are access nodes of a cellular network and may provide radio access to the UEs 1a-35 accessing the network. That is, in order to service user traffic, the plurality of eNBs 1a-05, 1a-10, 1a-15, and 1a-20 collect and schedule status information such as buffer status, available transmission power status, and channel status of the UEs, and support a connection between the UEs 1a-35 and a core network (CN).

The MME 1a-25 is a device that manages a mobility management function for the UE 1a-35 and various control functions. The MME 1a-25 may be connected to the plurality of eNBs 1a-05, 1a-10, 1a-15, and 1a-20. The S-GW 1a-30 may be a device that provides a data bearer. Also, the MME 1a-25 and the S-GW 1a-30 may further perform authentication and bearer management for the UEs 1a-35 accessing the network. The MME 1a-25 and the S-GW 1a-30 may process packets arriving from the plurality of eNBs 1a-05, 1a-10, 1a-15, and 1a-20 or packets to be transmitted to the plurality of eNBs 1a-05, 1a-10, 1a-15, and 1a-20.

Figure 1B:
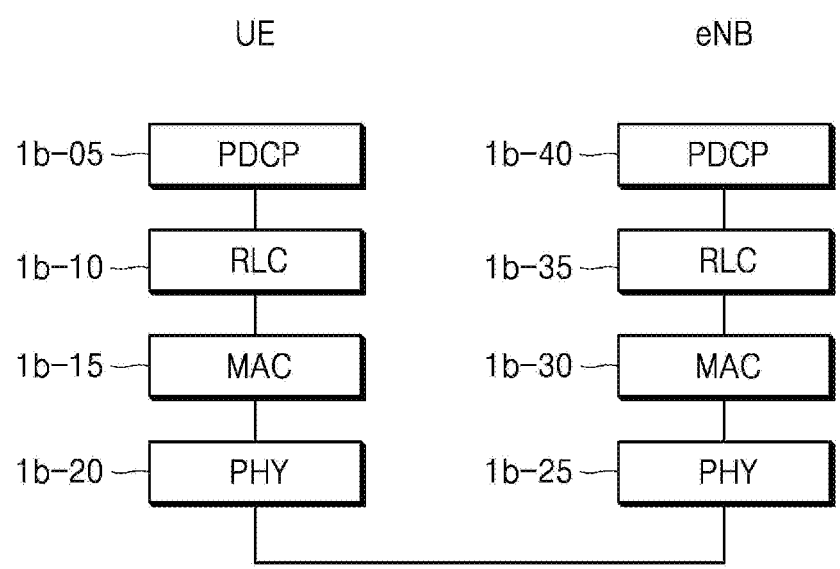
FIG. 1B is a diagram illustrating a radio protocol structure of the LTE system, according to an embodiment.

FIG. 1B is a diagram illustrating a radio protocol structure of the LTE system, according to an embodiment. An NR to be defined below may be different from the radio protocol structure of the disclosure, but will be described for convenience of description.

Referring to FIG. 1B, in the radio protocol of the LTE system, the UE and the eNB respectively includes packet data convergence protocols (PDCPs) 1b-05 and 1b-40, radio link controls (RLCs) 1b-10 and 1b-35, medium access controls (MACs) 1b-15 and 1b-30, and physical layers 1b-20 and 1b-25.

The PDCPs 1b-05 and 1b-40 may be responsible for operations such as internet protocol (IP) header compression and decompression, and the RLCs 1b-10 and 1b-35 may reconfigure PDCP packet data units (PDUs) to an appropriate size. The MACs 1b-15 and 1b-30 may be connected to a plurality of RLC layer devices configured in a single UE, and may perform an operation of multiplexing the RLC PDUs to MAC PDU and demultiplexing the RLC PDUs from the MAC PDU. Physical layers 1b-20 and 1b-25 may perform an operation of channel-coding and modulating upper layer data into an OFDM symbol and transmitting the OFDM symbol through a radio channel, or an operation of demodulating an OFDM symbol received through the radio channel, channel-decoding the demodulated OFDM symbol, and transmitting the channel-decoded OFDM symbol to the upper layer.

Also, the physical layers may use hybrid automated repeat request (HARQ) for additional error correction, and the receiving end may determine whether to receive the packet transmitted by the transmitting end in 1 bit. Information that determines whether to receive the packet transmitted by the transmitting end in 1 bit is referred to as HARQ acknowledgement (ACK) or negative acknowledgement (NACK) information. DL HARQ ACK or NACK information for UL transmission may be transmitted through a physical hybrid-ARQ indicator channel (PHICH) (a physical channel), and UL HARQ ACK or NACK information for DL transmission may be transmitted through a physical uplink control channel (PUCCH) or physical uplink shared channel (PUSCH) (a physical channel).

The PUCCH may be used for the UE to transmit, in addition to the HARQ ACK or NACK information, DL channel status information (CSI) and a scheduling request (SR) to the eNB. The SR is 1-bit information. When the UE transmits the SR to the resource in the PUCCH configured by the eNB, the eNB may recognize that there is data to be transmitted to the UL by the UE, and may allocate a UL resource. As the UL resource, the UE may transmit a detailed BSR message. The eNB may allocate a plurality of SR resources to a single UE. Also, there is a physical random access channel (PRACH) through which the UE transmits a specially designed preamble to the eNB when UL synchronization with the eNB is not matched.

A radio resource control (RRC) layer may be present above the PDCP layer of each of the UE and the eNB. The RRC layer may exchange a configuration control message related to access and measurement for RRC. For example, the eNB may instruct the UE to perform measurement by using the message of the RRC layer, and the UE may report the measurement result to the eNB by using the message of the RRC layer.

Figure 1C:
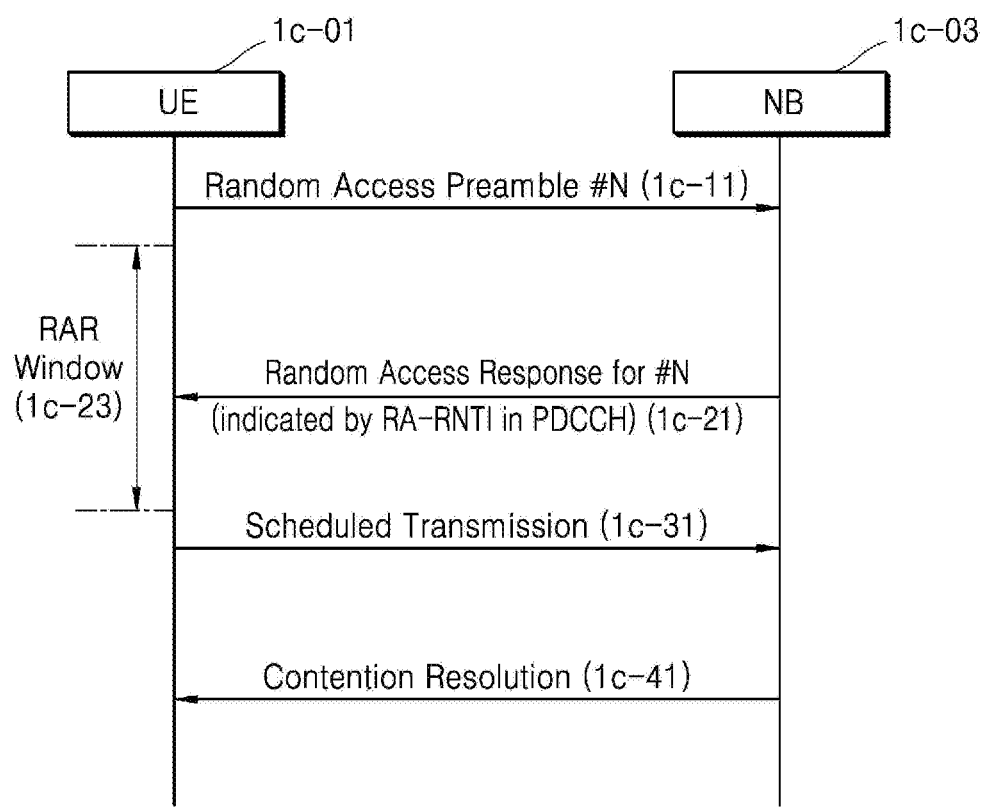
FIG. 1C illustrates a procedure by which a user equipment (UE) and a base station (NB) perform a random access, according to an embodiment.

FIG. 1C illustrates a procedure by which a UE 1c-01 and an NB 1c-03 perform a random access, according to an embodiment. Referring to FIG. 1C, the UE 1c-01 and the NB 1c-03 perform a contention-based four-step random access.

FIG. 1C is a diagram illustrating a contention-based four-step random access procedure that is performed in various cases in which the UE 1c-01 requires an initial connection, reconnection, handover, or random access to (or from) the NB 1c-03.

In order to connect to the NB 1c-03, the UE 1c-01 selects the above-described PRACH and transmits a random access preamble to the corresponding PRACH 1c-11. One or more UEs may simultaneously transmit the random access preamble by using a PRACH resource. The PRACH resource may be over a single subframe, or only some symbols in the single subframe may be used.

In addition, information about the PRACH resource may be included in system information that the NB 1c-03 broadcasts. Therefore, the UE 1c-01 may know through which time-frequency resource the preamble must be transmitted. Also, the random access preamble is a particular sequence specially designed to be received even when transmitted before being completely synchronized with the NB 1c-03, and there may be a plurality of preamble identifiers (indices) according to the standard. When there are the plurality of preamble identifiers, the preamble that is transmitted by the UE 1c-01 may be randomly selected by the UE 1c-01, or may be a particular preamble designated by the NB 1c-03.

When the NB 1c-03 receives the preamble, the NB 1c-03 transmits a random access response (RAR) message to the UE 1c-01. The RAR message may include identifier information of the preamble used in step 1c-11, UL transmission timing correction information, UL resource allocation information to be used in subsequent step 1c-31, and temporary UE identifier information.

The identifier information of the preamble may be transmitted so as to indicate which preamble the RAR message is a response message for, e.g., when a plurality of UEs attempt to perform the random access by transmitting different preambles in step 1c-11. The UL resource allocation information may be detailed information of a resource to be used by the UE 1c-01 in step 1c-31. The UL resource allocation information may include a physical location and size of the resource, a modulation and coding scheme (MCS) used at the time of transmission, and power adjustment information at the time of transmission.

Because the UE 1c-01 does not have the identifier assigned by the NB 1c-03 for communication with the NB 1c-03 when the UE 1c-01 having transmitted the preamble is initially connected, the temporary UE identifier information is a value that is transmitted.

The RAR message must be transmitted within a predefined period when a predefined time has elapsed after the transmission of the preamble. The predefined period is referred to as a "RAR window." The RAR window starts when a predefined time has elapsed after the transmission of the first preamble. The predefined time may have a value less than or equal to a subframe unit (1 ms) and is not limited thereto. Also, the length of the RAR window may be a predefined value that is configured by the NB 1c-03 for each PRACH resource or one or more PRACH resources in the system information message the NB 1c-03 broadcasts.

Meanwhile, when the RAR message is transmitted, the NB 1c-03 may schedule the corresponding RAR message through the PDCCH, and the corresponding scheduling information may be scrambled by using a random access-radio network temporary identifier (RA-RNTI). The RA-RNTI may be mapped to the PRACH resource used to transmit the message in step 1c-11, and the UE 1c-01, which has transmitted the preamble to the specific PRACH resource, attempts to receive the PDCCH based on the corresponding RA-RNTI and determines whether the corresponding RAR message is present. When the RAR message is the response to the preamble transmitted by the UE 1c-01 in step 1c-11 as illustrated in FIG. 1B, the RA-RNTI used for the RAR message scheduling information may include information about the transmission in step 1c-11. To this end, the RA-RNTI may be calculated based on Equation (1), below.

$$RA\text{-}RNTI = 1 + s\_id + 14 \times t\_id + 14 \times 80 \times f\_id + 14 \times 80 \times 8 \times ul\_carrier\_id \quad (1)$$

In this case, s_id is an index corresponding to the first OFDM symbol in which the transmission of the preamble transmitted in step 1c-11 is started, and may have a value of 0≤s_id<14 (that is, a maximum number of OFDMs in a single slot).

Also, t_id is an index corresponding to the first slot in which the transmission of the preamble transmitted in step 1c-11 is started, and may have a value of 0≤t_id<80 (that is, a maximum number of slots in a single system frame (19 ms)).

Also, f_id indicates which ordinal number (e.g., index) of a PRACH resource the preamble transmitted in step 1c-11 based on frequency, and may have a value of 0≤f_id<8 (that is, a maximum number of PRACHs based on frequency within the same time).

ul_carrier_id may be a parameter that, when using two carriers as UL with respect to a single cell, distinguishes whether the preamble is transmitted in a normal UL (NUL) (0 in this case) or whether the preamble is transmitted in a supplementary UL (SUL) (1 in this case).

The UE 1c-01, which has received the RAR message, transmits another message to the resource allocated to the RAR message according to step 1c-31. The third message transmitted in step 1C-31 in FIG. 1C is also referred to as Msg3. In addition, the preamble in step 1c-11 or 1c-13 is also referred to as Msg1, and the RAR in step 1c-21 is also referred to as Msg2. As an example of Msg3 transmitted by the UE 1c-01, in the case of initial connection, an RRCRequest message, which is a message of an RRC layer, is transmitted. In the case of reconnection, an RRCReestablishmentRequest message is transmitted. In the case of handover, an RRCReconfigurationComplete message is transmitted. Alternatively, a BSR message for a resource request may be transmitted as Msg3.

In the case of initial transmission (that is, in the case in which Msg3 does not include base station identifier information previously allocated to the UE 1c-01), the UE 1c-01 may receive a contention resolution message from the NB 1c-03. The contention resolution message includes contents the UE 1c-01 transmits in Msg3. Therefore, when there are a plurality of UEs that have selected the same preamble in operation 1c-11 or 1c-13, it is possible to know which UE has responded.

Figure 1D:
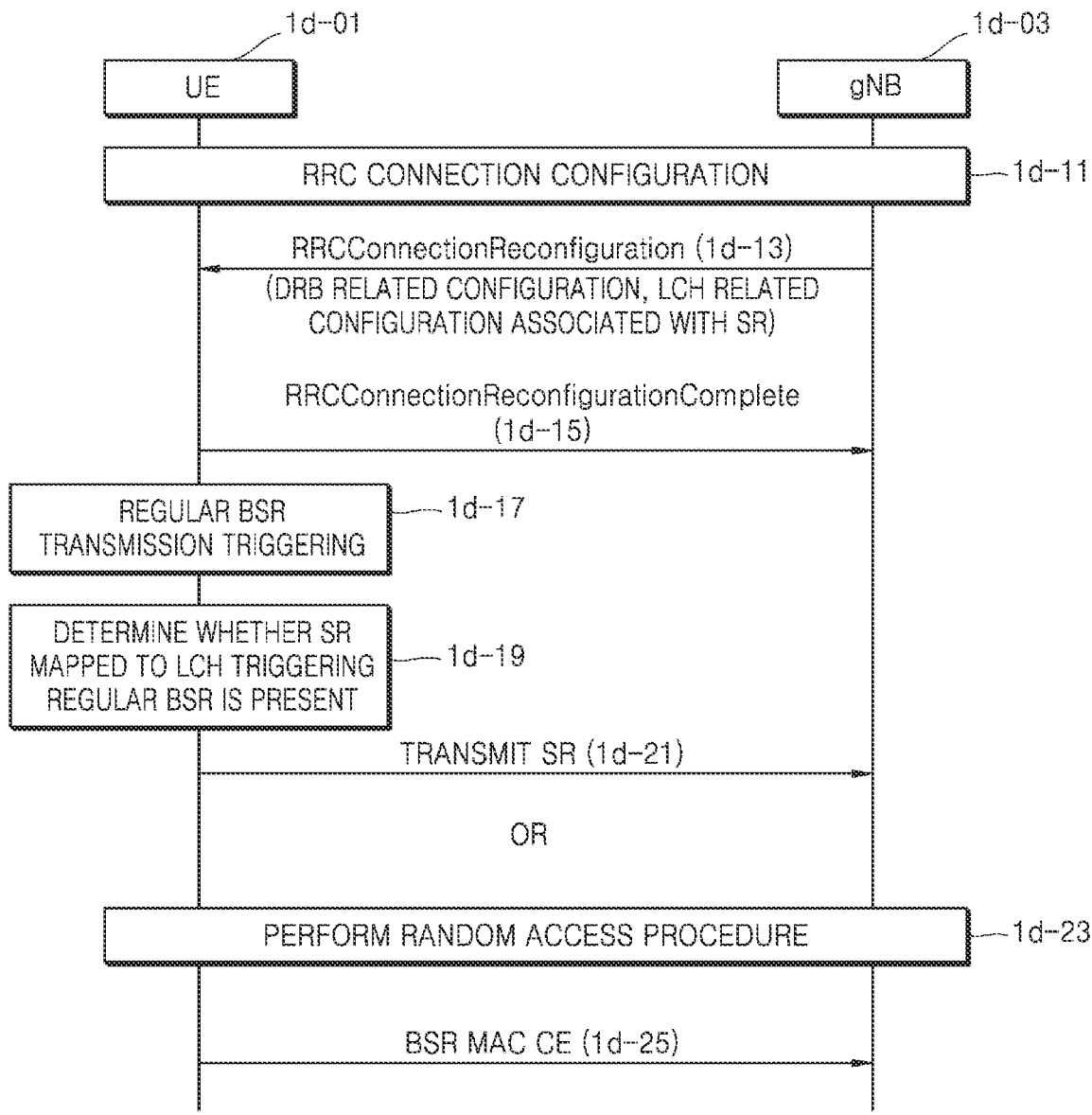
FIG. 1D illustrates an example of a message flow between a UE and a next generation node B (base station) (gNB) during uplink (UL) data transmission, according to an embodiment.

FIG. 1D illustrates an example of a message flow between a UE 1d-01 and a gNB 1d-03 during UL data transmission, according to an embodiment.

Referring to FIG. 1D, the UE 1d-01 in an idle mode (RRC_IDLE) connects to the gNB 1d-03 for generation of data to be transmitted in step 1d-11. The idle mode is a state in which the UE 1d-01 is not able to transmit data because the UE 1d-01 is not connected to the network so as to save power for the UE 1d-01. The UE 1d-01 may need to transition to a connected mode (RRC_CONNECTED) for data transmission. When the UE 1d-01 succeeds in connecting to the gNB 1d-03, the UE 1d-01 may change to the connected mode (RRC_CONNECTED). The UE 1d-01 in the connected mode may be enabled to transmit or receive data with the gNB 1d-03 through security activation and bearer configuration for data to be described below.

Subsequently, the gNB 1d-03 may generate a logical (or virtual) channel through which data may be transmitted, so that the UE 1d-01 is enabled to transmit data. The logical (or virtual) channel through which data may be transmitted is referred to as a data radio bearer (DRB). In contrast, a logical (or virtual) channel through which control signals may be transmitted is referred to as a signaling radio bearer (SRB). The DRB and the SRB may have respective logical channel identities (LCIDs). When signaling information or data is transmitted in the DL or UL, the transmitting end may transmit an LCID corresponding to a data type, while being included in a header, according to the data type in the MAC layer. The receiving end may determine whether the received packet is signaling information or a data packet by using the LCID. When the received packet is the signaling information or a data packet, the receiving end may distinguish the received data by determining to which DRB the data belongs.

In order to configure the DRB as described above, the gNB 1d-03 may transmit an RRCReconfiguration message to the UE 1d-01 and newly configure the DRB to the UE 1d-01, and DRB configuration information may include the above-described PDCP, RLC, and MAC layer related configuration information in step 1d-13. When a plurality of DRBs are configured, separate configuration information may be included for each DRB. Also, as the MAC layer related information, logical channel group (LCG) information may be configured for each DRB. For example, when the gNB 1d-03 configures a total of five DRBs to the UE 1d-01, LCIDs may be assigned to each DRB like 3, 4, 5, 6, and 7, respectively. LCIDs 3 and 4 may be grouped and assigned to LCG 1; LCIDs 5 and 6 may be grouped and assigned to LCG 2; and LCID 7 may be assigned to LCG 3. The LCG is used when the UE 1d-01 requests a resource from the gNB 1d-03 to be described later. For example, when the UE 1d-01 has 100 bytes of data to be transmitted to LCID 3; 100 bytes of data to be transmitted to LCID 4; and 100 bytes of data to be transmitted to LCID 7, the UE 1d-01 may report to the gNB 1d-03 that the UE 1d-01 has 200 bytes of data to be transmitted to LCG 1 and 100 bytes of data to be transmitted to LCG 3, instead of reporting the amount of data to be transmitted for each LCID.

Also, the UE 1d-01 may trigger a BSR of a current UE according to the following various conditions (1)-(3), and the BSR may be divided as follows according to the condition in which the transmission is triggered.

(1): First type: Regular BSR
  When there is data that is transmittable by the UE with respect to a certain logical channel/radio bearer (RB) belonging to LCG, BSR that is transmitted when a BSR retransmission timer (retxBSR-Timer) has expired.
  BSR that is transmitted when data to be transmitted from the upper layer (RLC or PDCP layer) with respect to a logical channel/RB belonging to LCG is generated and this data has a priority higher than that of a logical channel/RB belonging to a certain LCG.
  BSR that is transmitted when data to be transmitted from the upper layer (RLC or PDCP layer) with respect to a logical channel/RB belonging to LCG is generated and there is no data in LCG, except for this data.
(2): Second type: Periodic BSR
  BSR that is transmitted when a periodic BSR timer (periodicBSR-Timer) configured to the UE has expired.
(3): Third type: Padding BSR
  BSR that is transmitted when a UL resource is allocated and a padding bit filling the remaining space after transmission of data is greater than or equal to the sum of a size of a BSR MAC CE and a sub-header size of the BSR MAC CE.
  When there are packets in buffers of a plurality of LCGs, truncated BSR is transmitted.

Also, the configuration included in step 1d-13 may include an SR resource and related configuration information for a UL resource request for each LCID. When regular BSR is triggered by a specific LCID, a scheduling request may be transmitted to the gNB by using the SR resource according to whether there is the SR resource configured to the specific LCID. When there is no mapped SR resource, the UE 1d-01 performs a random access.

Also, in the configuration included in step 1d-13, "configured UL grant" may be configured so that UL data is periodically transmitted to the UE 1d-01 without resource allocation (that is, without scheduling through PDCCH). Therefore, the UE 1d-01 may periodically transmit UL data in the configured UL resource according to the configured UL grant.

The regular BSR is triggered in step 1d-17. The disclosure is not limited to the case in which the regular BSR is triggered, and may be applied to cases in which different kinds of BSR are triggered.

When there is an SR mapped to the logical channel triggering the regular BSR, the UE 1d-01 transmits the SR to the corresponding SR resource in step 1d-21. The gNB 1d-03, which has received the SR, may allocate a UL resource to the UE 1d-01, and the UE 1d-01 transmits BSR information to the corresponding UL resource in step 1d-25.

When there is no SR mapped to the logical channel triggering the regular BSR, the above-described random access procedure is performed in step 1d-23 and BSR information is transmitted to Msg3 in step 1d-25. In the BSR transmission, the UE 1d-01 transmits the BSR by using MAC CE, which is the control message of the MAC layer. When there is data in a plurality of LCGs, long BSR MAC CE is used.

When there is data in only one LCG, short BSR MAC CE is used.

Meanwhile, when the UL resource is allocated to the gNB 1d-03 before the RAR is received during the random access procedure, the UE 1d-01 may transmit the BSR message to the corresponding resource. When the information about the buffer status triggering the regular BSR is completely transmitted, the UE 1d-01 may cancel the random access procedure. Because the BSR message that is a target has already been transmitted, thus it is not required to perform an unnecessary random access process which causes an increase in the congestion of the PRACH channel.

Figure 1E:
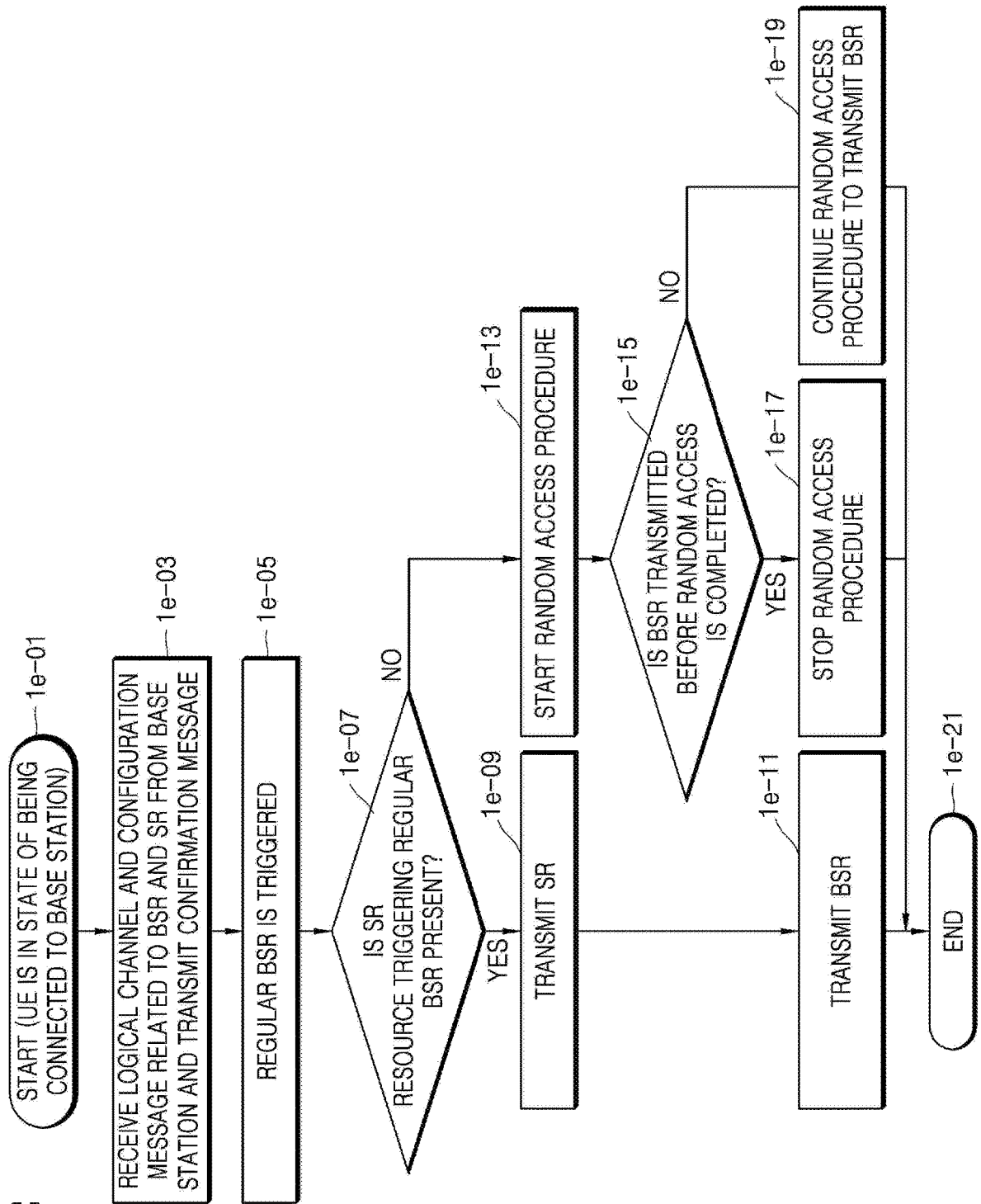
FIG. 1E illustrates an example of an operation sequence of a UE during UL data transmission, according to an embodiment.

FIG. 1E illustrates an example of an operation sequence of a UE during UL data transmission, according to an embodiment.

As described with reference to FIG. 1D, the UE is connected to the BS in step 1e-01. The UE receives a configuration message that is related to a logical channel, a BSR, and an SR from the BS and transmits a confirmation message therefor in step 1e-03. The configuration message and the confirmation message may use an RRCReconfiguration message and an RRCReconfigurationComplete message, respectively.

When regular BSR is triggered in step 1e-05, the UE determines, from the configuration received from the BS, whether an SR resource mapped to a logical channel triggering the regular BSR is present or available in step 1e-07.

When the SR resource is present, the UE transmits the SR to the corresponding resource and waits for a UL resource from the BS in step 1e-09. When the resource for the BSR has not been allocated from the BS for a predefined time, or when the number of transmissions of the SR does not reach a maximum number of times, the UE may retransmit the corresponding SR. The reason why the resource for BSR is not allocated from the BS may be because many terminals exist and thus it is difficult to allocate the UL resources to the UE, or because the BS does not properly receive the SR transmission. When the BS allocates the UL resource, the UE transmits the BSR to the BS and ends the procedure in step 1e-11.

When the SR resource is not present, the UE starts a random access procedure in step 1e-13. When the UL resource is received from the BS during the random access procedure in step 1e-15, the UE transmits the BSR to the corresponding resource and stops the random access procedure in step 1e-17. Otherwise, the UE continues the random access procedure to transmit the BSR to Msg3 in step 1e-19, and terminates the procedure in step 1e-21.

FIG. 1F illustrates an example of a message flow between a UE 1f-01 and a gNB 1f-03 during UL data transmission, according to an embodiment.

Referring to FIG. 1F, the UE 1f-01 in an idle mode (RRC_IDLE) connects to the gNB 1f-03 to generate data to be transmitted in step 1f-11. The idle mode is a state in which the UE 1f-01 is not able to transmit data because the UE 1f-01 is not connected to the network so as to save power for the UE 1f-01. The UE 1f-01 may need to transition to a connected mode (RRC_CONNECTED) for data transmission. When the UE 1f-01 succeeds in connecting to the gNB 1f-03, the UE 1f-01 may change to the connected mode (RRC_CONNECTED). The UE 1f-01 in the connected mode may be enabled to transmit or receive data with the gNB 1*f*-03 through security activation and bearer configuration for data to be described below.

Subsequently, the gNB 1*f*-03 may generate a logical (or virtual) channel through which data may be transmitted, so that the UE 1*f*-01 is enabled to transmit data. The logical (or virtual) channel through which data may be transmitted is referred to as a DRB. In contrast, a logical (or virtual) channel through which control signals may be transmitted is referred to as an SRB. The DRB and the SRB may have respective LCIDs. When signaling information or data is transmitted in the DL or UL, the transmitting end may transmit an LCID corresponding to a data type, while being included in a header, according to the data type in the MAC layer. The receiving end may determine whether the received packet is signaling information or a data packet by using the LCID. When the received packet is the data, the receiving end may distinguish the received data by determining to which DRB the data belongs.

In order to configure the DRB as described above, the gNB 1*f*-03 transmits an RRCReconfiguration message to the UE 1*f*-01 and newly configure the DRB to the UE 1*f*-01, and DRB configuration information may include the above-described PDCP, RLC, and MAC layer related configuration information in step 1*f*-13. When a plurality of DRBs are configured, separate configuration information may be included for each DRB. Also, as the MAC layer related information, LCG information may be configured for each DRB. For example, when the gNB 1*f*-03 configures a total of five DRBs to the UE 1*f*-01, LCIDs may be assigned to each DRB 3, 4, 5, 6, and 7, respectively. LCIDs 3 and 4 may be grouped and assigned to LCG 1; LCIDs 5 and 6 may be grouped and assigned to LCG 2; and LCID 7 may be assigned to LCG 3. The LCG is used when the UE 1*f*-01 requests a resource from the gNB 1*f*-03 to be described later. For example, when the UE 1*f*-01 has 100 bytes of data to be transmitted to LCID 3, 100 bytes of data to be transmitted to LCID 4, and 100 bytes of data to be transmitted to LCID 7, the UE 1*f*-01 may report to the gNB 1*f*-03 that the UE 1*f*-01 has 200 bytes of data to be transmitted to LCG 1 and 100 bytes of data to be transmitted to LCG 3, instead of reporting the amount of data to be transmitted for each LCID.

Also, the UE 1*f*-01 may trigger a BSR of a current UE according to the following various conditions (1)-(3), and the BSR may be divided as follows according to the condition in which the transmission is triggered.

(1): First type: Regular BSR
When there is data that is transmittable by the UE with respect to a certain logical channel/radio bearer (RB) belonging to LCG, BSR that is transmitted when a BSR retransmission timer (retxBSR-Timer) expires.
BSR that is transmitted when data to be transmitted from the upper layer (RLC or PDCP layer) with respect to a logical channel/RB belonging to LCG and this data has a priority higher than that of a logical channel/RB belonging to a certain LCG.
BSR that is transmitted when data to be transmitted from the upper layer (RLC or PDCP layer) with respect to a logical channel/RB belonging to LCG is generated and there is no data in LCG, except for this data.
(2) Second type: Periodic BSR
BSR that is transmitted when a periodic BSR timer (periodicBSR-Timer) configured to the UE has expired.
(3) Third type: Padding BSR
BSR that is transmitted when a UL resource is allocated and a padding bit filling the remaining space after transmission of data is equal to or greater than the sum of a size of a BSR MAC CE and a sub-header size of the BSR MAC CE.
When there are packets in buffers of a plurality of LCGs, truncated BSR is transmitted.

In addition, the configuration included in step 1*f*-13 may include an SR resource and related configuration information for a UL resource request for each LCID. When regular BSR is triggered by a specific LCID, a scheduling request may be transmitted to the gNB 1*f*-03 by using the SR resource according to whether there is the SR resource configured to the specific LCID. When there is no mapped SR resource, the UE 1*f*-01 performs a random access.

Additionally, in the configuration included in step 1*f*-13, "configured UL grant" may be configured so that UL data is periodically transmitted to the UE without resource allocation (that is, without scheduling through PDCCH). Therefore, the UE 1*f*-01 may periodically transmit UL data in the configured UL resource according to the activation of the configured UL grant.

The regular BSR is triggered in step 1*f*-17. The disclosure is not limited to the case in which the regular BSR is triggered, and may be applied to the cases in which different types of BSR are triggered.

In step 1*f*-19, the UE 1*f*-01 determines whether the SR mapped to the logical channel triggering the regular BSR is present. When the SR is present, the UE 1*f*-01 transmits the SR to the corresponding SR resource.

However, when the SR is not present, the UE 1*f*-01 identifies whether there is a configured UL resource (configured uplink grant) activated by the gNB 1*f*-03 in step 1*f*-13 (or among configuration values received in the RRCReconfiguration message before and after step 1*f*-13). When the configured UL resource (configured UL grant) is present, the UE 1*f*-01 determines whether the period of the configured UL resource is less than or equal to a predefined value in step 1*f*-21.

When the period of the configured UL resource period is greater than the predefined value, the UE 1*f*-01 performs a random access procedure in step 1*f*-23 and transmits BSR information in step 1*f*-25. However, when the period of the configured UL resource is less than or equal to the predefined value, the UE 1*f*-01 does not perform the random access procedure, and transmits a BSR to the activated configured UL grant that is to be soon present in step 1*f*-25.

Therefore, even when the SR resource is not configured in the corresponding logical channel, the UE 1*f*-01 may transmit the BSR without unnecessarily performing the random access procedure, and the probability of success of random access of other UEs may also be increased.

FIG. 1G illustrates an example of an operation sequence of a UE during UL data transmission, according to an embodiment.

As described with reference to FIG. 1G, the UE is connected to the BS in step 1*g*-01. In step 1G-03, the UE receives a configuration message that is related to a logical channel, a BSR, and an SR from a BS and transmit a confirmation message therefor. The configuration message and the confirmation message may use an RRCReconfiguration message and an RRCReconfigurationComplete message, respectively.

When regular BSR is triggered in step 1*g*-05, the UE determines from the configuration received from the BS whether an SR resource mapped to a logical channel triggering the regular BSR is present or available in step 1*g*-07.

When the SR resource is present, the UE transmits the SR to the corresponding resource and waits for a UL resource from the BS in step 1g-09. When the resource for the BSR has not been allocated from the BS for a predefined time, and/or when the number of transmissions of the SR does not reach a maximum number of times, the UE may retransmit the corresponding SR. The reason why the resource for BSR has not been allocated from the BS may be because many terminals exist and thus it is difficult to allocate the UL resources to the UE, or because the BS does not properly receive the SR transmission. When the BS allocates the UL resource, the UE transmits the BSR to the BS in step 1g-11, and ends the procedure in step 1g-21.

When the SR resource is not present, the UE determines whether the activated configured UL grant allocated from the BS is configured in the configuration information in step 1g-13. When the activated configured UL grant is not present, the UE performs a random access procedure to transmit BSR information immediately in step 1g-19. When the activated UL grant allocated from the BS is configured, the UE determines whether the period of the grant is less than or equal to a predefined value in step 1g-15. The predefined value may be set to a sufficiently short value, for example, 10 milliseconds (ms). When the period is less than or equal to the predefined value, the UE does not trigger a random access even when the SR resource is not configured in the logical channel triggering the corresponding BSR, and transmits a BSR to a subsequently activated configured UL resource (or configured UL grant) (i.e., transmits a BSR through general UL resource allocation) in step 1g-17.

Therefore, even when the SR resource is not configured in the corresponding logical channel, the UE may transmit the BSR without unnecessarily performing the random access procedure, and the probability of success of random access of other UEs may also be increased. That is, according to the embodiments of the disclosure, the UE may report the buffer status in a timely manner, and may increase the probability of success of the random access by preventing unnecessary random access.

Figure 1H:
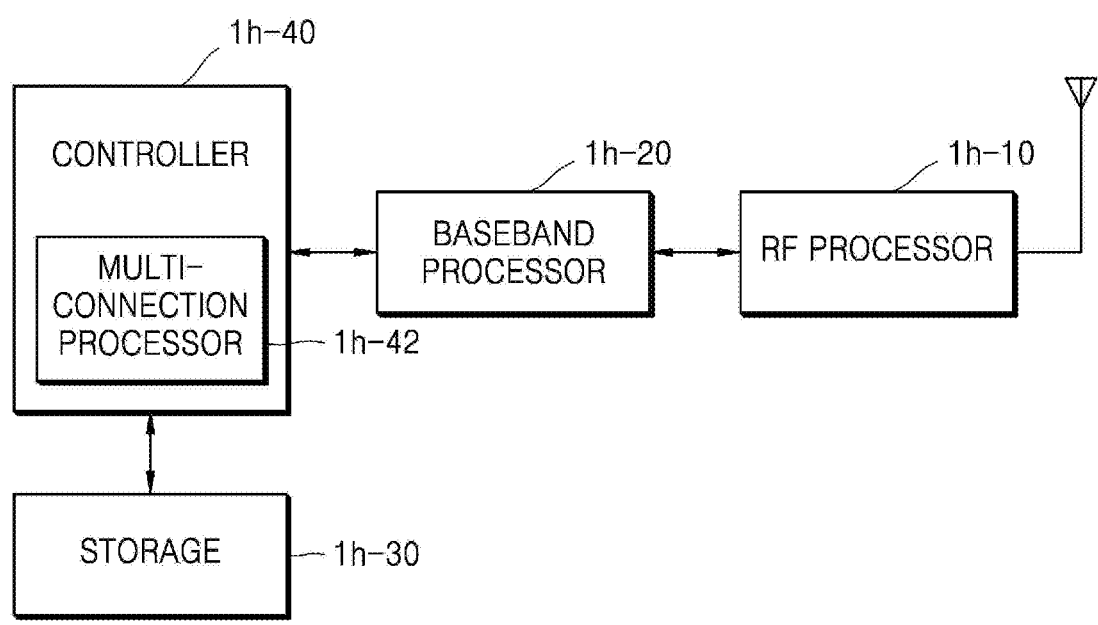
FIG. 1H illustrates a configuration of a UE, according to an embodiment.

FIG. 1H illustrates a configuration of a UE, according to an embodiment.

Referring to FIG. 1H, the UE includes a radio frequency (RF) processor 1h-10, a baseband processor 1h-20, a storage 1h-30, and a controller 1h-40. The UE may include additional or fewer components than those illustrated in FIG. 1H.

The RF processor 1h-10 may perform a function for transmitting or receiving signals through a radio channel, such as signal band conversion and signal amplification. That is, the RF processor 1h-10 may up-convert a baseband signal provided from the baseband processor 1h-20 into an RF band signal and transmit the RF band signal through an antenna, and may down-convert an RF band signal received through the antenna into a baseband signal. For example, the RF processor 1h-10 may include a transmission filter, a reception filter, an amplifier, a mixer, an oscillator, a digital-to-analog convertor (DAC), and an analog-to-digital convertor (ADC). Although only one antenna is illustrated in FIG. 1H, the UE may include a plurality of antennas. Also, the RF processor 1h-10 may include a plurality of RF chains. Furthermore, the RF processor 1h-10 may perform beamforming. For beamforming, the RF processor 1h-10 may adjust phases and amplitudes of signals transmitted or received through a plurality of antennas or antenna elements. Also, the RF processor 1h-10 may perform a MIMO operation, and may receive a plurality of layers when the MIMO operation is performed.

The baseband processor 1h-20 may perform a conversion function between a baseband signal and a bit stream in accordance with the physical layer standard of the system. For example, when data is transmitted, the baseband processor 1h-20 may encode and modulate a transmission bit stream to generate complex symbols. Also, when data is received, the baseband processor 1h-20 may demodulate and decode a baseband signal provided from the RF processor 1h-10 to reconstruct a reception bit stream. For example, in accordance with an OFDM scheme, when data is transmitted, the baseband processor 1h-20 may encode and modulate a transmission bit stream to generate complex symbols, map the complex symbols to sub-carriers, and construct OFDM symbols through an inverse fast Fourier transform (IFFT) operation and cyclic prefix (CP) insertion. Also, when data is received, the baseband processor 1h-20 may divide a baseband signal provided from the RF processor 1h-10 on an OFDM symbol basis, reconstruct signals mapped to sub-carriers through a fast Fourier transform (FFT) operation, and reconstruct a reception bit stream through demodulation and decoding.

The baseband processor 1h-20 and the RF processor 1h-10 may transmit and receive signals as described above. Accordingly, the baseband processor 1h-20 and the RF processor 1h-10 may be referred to as a transmitter, a receiver, a transceiver, or a communicator. Also, at least one of the baseband processor 1h-20 or the RF processor 1h-10 may include different communication modules so as to process signals of different frequency bands. The different frequency bands may include a super high frequency (SHF) (e.g., 2.5 GHz or 5 GHz) band and a millimeter wave (e.g., 60 GHz) band. The UE may transmit signals to the BS or receive signals from the BS by using the baseband processor 1h-20 and the RF processor 1h-10, and the signals may include control information and data.

The storage 1h-30 may store a basic program, an application program, and data, such as configuration information, for the operation of the UE. The storage 1h-30 may be a storage medium such as read-only memory (ROM), random access memory (RAM), hard disk, compact disk-ROM (CD-ROM), and digital versatile disc (DVD), or a combination of storage media. Also, the storage 1h-30 may include a plurality of memories. Additionally, the storage 1h-30 may store a program for performing the method of transmitting the buffer status report according to the embodiment of the disclosure.

The controller 1h-40 may control overall operations of the UE. For example, the controller 1h-40 may transmit or receive signals through the baseband processor 1h-20 and the RF processor 1h-10. Also, the controller 1h-40 may record data to the storage 1h-30 and read data from the storage 1h-30. To this end, the controller 1h-40 may include at least one processor. For example, the controller 1h-40 may include a communication processor configured to control communication and an application processor (AP) configured to control an upper layer such as an application program. Also, at least one configuration in the UE may be implemented by a single chip. The controller 1h-40 may includes a multiple connection processor 1h-42 configured to perform a process of operating in a multiple connection mode.

When an SR is triggered according to a configured UL resource period and a random access needs to be performed, the controller 1h-40 may determine whether to perform the random access and transmit a BSR. That is, the respective components of the UE may operate to perform the above-described embodiments of the disclosure.

Figure 1I:
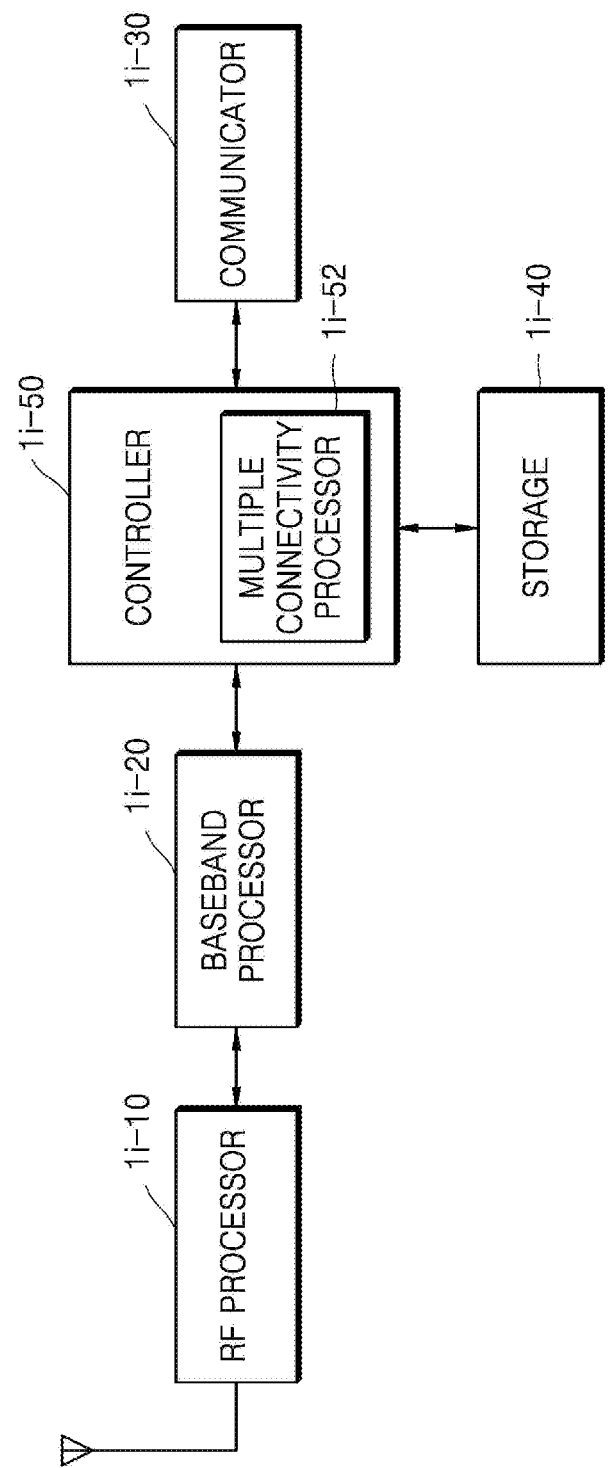
FIG. 1I illustrates a configuration of a base station, according to an embodiment.

FIG. 1I illustrates a configuration of a BS, according to an embodiment.

Referring to FIG. 1I, the BS includes an RF processor 1i-10, a baseband processor 1i-20, a communicator 1i-30, a storage 1i-40, and a controller 1i-50. The BS may include additional or fewer components than those illustrated in FIG. 1I.

The RF processor 1i-10 may perform a function for transmitting or receiving signals through a radio channel, such as signal band conversion and signal amplification. The RF processor 1i-10 may up-convert a baseband signal provided from the baseband processor 1i-20 into an RF band signal and transmit the RF band signal through an antenna. The RF processor i1-10 may down-convert an RF band signal received through the antenna into a baseband signal. For example, the RF processor 1i-10 may include a transmission filter, a reception filter, an amplifier, a mixer, an oscillator, a DAC, and an ADC. Although only one antenna is illustrated in FIG. 1I, the RF processor 1i-10 may include a plurality of antennas. Also, the RF processor 1i-10 may include a plurality of RF chains. Also, the RF processor 1i-10 may perform beamforming. For beamforming, the RF processor 1i-10 may adjust phases and amplitudes of signals transmitted or received through a plurality of antennas or antenna elements. The RF processor 1i-10 may perform a downlink MIMO operation by transmitting one or more layers.

The baseband processor 1i-20 may perform a conversion function between a baseband signal and a bit stream in accordance with the physical layer standard of a predefined radio connection technology. For example, when data is transmitted, the baseband processor 1i-20 may encode and modulate a transmission bit stream to generate complex symbols. Also, when data is received, the baseband processor 1i-20 may demodulate and decode a baseband signal provided from the RF processor 1i-10 to reconstruct a reception bit stream. For example, in accordance with an OFDM scheme, when data is transmitted, the baseband processor 1i-20 may encode and modulate a transmission bit stream to generate complex symbols, map the complex symbols to sub-carriers, and construct OFDM symbols through an IFFT operation and CP insertion. Also, when data is received, the baseband processor 1i-20 may divide a baseband signal provided from the RF processor 1i-10 on an OFDM symbol basis, reconstruct signals mapped to sub-carriers through an FFT operation, and reconstruct a reception bit stream through demodulation and decoding. The baseband processor 1i-20 and the RF processor 1i-10 may transmit and receive signals as described above. Accordingly, the baseband processor 1i-20 and the RF processor 1i-10 may be referred to as a transmitter, a receiver, a transceiver, a communicator, or a radio communicator. The BS may transmit signals to the UE or receive signals from the UE by using the baseband processor 1i-20 and the RF processor 1i-10, and the signals may include control information and data.

The communicator 1i-30 may provide an interface configured to communicate with other nodes in the network. That is, the communicator 1i-30 may convert a bit stream transmitted from a main BS to other nodes (e.g., an auxiliary BS or a CN) into a physical signal, and convert a physical signal received from the other nodes into a bit stream. The communicator 1i-30 may be a backhaul communicator.

The storage 1i-40 may store a basic program, an application program, and data, such as configuration information, for the operation of the BS. The storage 1i-40 may store information about a bearer allocated to the connected UE, and a measurement result reported from the connected UE. Also, the storage 1i-40 may store information that is a criterion for determining whether to provide the multiple connection to the UE or whether to stop the multiple connection. The storage 1i-40 may provide the stored data according to the request from the controller 1i-50. The storage 1i-40 may be a storage medium such as ROM, RAM, hard disk, CD-ROM, and DVD, or a combination of storage media. Also, the storage 1i-40 may include a plurality of memories. The storage 1i-40 may store a program for performing the method of transmitting the BSR according to the embodiment of the disclosure.

The controller 1i-50 may control overall operations of the BS. For example, the controller 1i-50 may transmit or receive signals through the baseband processor 1i-20 and the RF processor 1i-10 or through the backhaul communicator 1i-30. Also, the controller 1i-50 may record data to the storage 1i-40 and read data from the storage 1i-40. To this end, the controller 1i-50 may include at least one processor. Also, at least one configuration in the base station may be implemented by a single chip. That is, the respective components of the BS may operate to perform the above-described embodiments of the disclosure.

Methods according to embodiments described in the claims or the specification of the disclosure may be implemented as hardware, software, or a combination of hardware and software.

When implemented as software, a non-transitory computer-readable storage medium storing at least one program (a software module) may be provided. The at least one program stored in the non-transitory computer-readable storage medium is configured to be executable by one or more processors in an electronic device. The one or more programs include instructions causing the electronic device to execute the methods according to the embodiments described in the claims or the specification of the disclosure.

The at least one program (the software module or the software) may be stored in a non-volatile memory including RAM and flash memory, ROM, electrically erasable programmable read-only memory (EEPROM), magnetic disc storage device such as CD-ROM, DVD, or other optical storage devices, and/or magnetic cassette storage devices. Alternatively, the at least one program may be stored in a memory constituted by a combination of all or part of one or more storage devices. Also, each of type of memory may be provided in a multiple number.

The at least one program may also be stored in an attachable storage device that is accessible via a communication network including Internet, Intranet, a local area network (LAN), a wide LAN (WLAN), a storage area network (SAN), or a combination thereof. The storage device may access, via an external port, an apparatus for performing the embodiments of the disclosure. Also, a separate storage device on a communication network may access the apparatus for performing the embodiments of the disclosure.

The components included in the disclosure have been expressed in singular or plural form according to the suggested specific embodiments of the disclosure. However, such expressions in the singular or plural form are appropriately selected according to the suggested situations for convenience of explanation, and are not intended to limit the disclosure to singular or plural components. Even though a certain component is expressed in a plural form, it may be provided with a single component, and even though a certain component is expressed in a singular form, it may be provided with a plurality of components.

According to the embodiments of the disclosure, the BSR may be transmitted in a timely manner in a wireless communication system, and the probability of success of the random access may be increased.

Although specific embodiments of the disclosure have been described in the detailed description of the disclosure, various modifications may be made thereto without departing from the scope of the disclosure. Therefore, the scope of the disclosure should not be limited to the described embodiments of the disclosure, but should be determined by the appended claims and their equivalents.

That is, it will be apparent to those of ordinary skill in the art that other modifications based on the technical spirit of the disclosure may be implemented. Also, the respective embodiments of the disclosure may be combined with each other when necessary. For example, portions of the methods proposed in the disclosure may be combined with each other so that the BS and the UE are efficiently operated. Also, although the embodiments of the disclosure are presented based on 5G or NR systems, other modifications based on the technical spirit of the embodiments of the disclosure may also be implemented in other systems such as LTE, LTE-A, or LTE-A-Pro systems.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method of transmitting a buffer status report (BSR) of a user equipment, the method comprising:
receiving, from a base station, a configuration message regarding a configured uplink resource used for transmitting uplink data based on a transmission period without scheduling through a physical downlink control channel (PDCCH), wherein the transmission period of the configured unlink resource is set based on the received configuration message;
triggering a procedure for the BSR corresponding to a predefined logical channel;
determining whether a resource for transmitting a scheduling request corresponding to the logical channel is allocated by the base station;
determining whether the configured uplink resource is activated, if the resource for transmitting a scheduling request is not allocated; and
if the configured uplink resource is activated, transmitting the BSR by using the configured uplink resource, in case that the transmission period of the configured uplink resource is less than a threshold value or transmitting the BSR through a random access procedure in case that the transmission period of the configured uplink resource is greater than or equal to the threshold value.

2. The method of claim 1, further comprising transmitting the BSR through a random access procedure if the configured uplink resource is not allocated.

3. The method of claim 2, wherein transmitting of the BSR through the random access procedure when the configured uplink resource is not allocated further comprises transmitting the BSR through Msg3 (Message3).

4. The method of claim 2, wherein transmitting of the BSR through the random access procedure when the configured uplink resource is not allocated further comprises stopping performing the random access procedure when an uplink resource is allocated during the random access procedure and transmitting the BSR by using the allocated uplink resource.

5. The method of claim 3, further comprising:
if the resource for transmitting the scheduling request is allocated, transmitting the scheduling request by using the resource for transmitting the allocated scheduling request; and transmitting the BSR by using the allocated uplink resource in response to the scheduling request.

6. The method of claim 1, further comprising:
receiving a configuration message for at least one of the predefined logical channel, the BSR, or the scheduling request; and
transmitting a confirmation message for the configuration message.

7. A user equipment for transmitting a buffer status report (BSR), the user equipment comprising:
a transceiver; and
at least one controller coupled with the transceiver and configured to:
receive, from a base station, a configuration message regarding a configured uplink resource used for transmitting uplink data based on a transmission period without scheduling through a physical downlink control channel (PDCCH), wherein the transmission period of the configured uplink resource is set based on the received configuration message;
trigger a procedure for the BSR corresponding to a predefined logical channel,
determine whether a resource for transmitting a scheduling request corresponding to the predefined logical channel is allocated by the base station,
determine whether the configured uplink is activated, if the resource for transmitting a scheduling request is not allocated, and
if the configured uplink resource is activated, transmit the BSR by using the configured uplink resource in case that the transmission period of the configured uplink resource is less than a threshold value or transmit the BSR through a random access procedure in case that the transmission period of the configured uplink resource is greater than or equal to the threshold value.

8. The user equipment of claim 7, wherein the at least one controller is further configured to transmit the BSR through a random access procedure if the configured uplink resource is not allocated.

9. The user equipment of claim 8, wherein the at least one controller is further configured to transmit the BSR through Msg3 (Message3).

10. The user equipment of claim 8, wherein the at least one controller is further configured to:
stop performing the random access procedure when an uplink resource is allocated during the random access procedure, and
transmit the BSR by using the allocated uplink resource.

11. The user equipment of claim 9, wherein the at least one controller is further configured to, if the resource for transmitting the scheduling request is allocated:
transmit the scheduling request by using the resource for transmitting the allocated scheduling request, and
transmit the BSR by using the allocated uplink resource in response to the scheduling request.

12. The user equipment of claim 7, wherein the user equipment is further configured to receive a configuration message for the predefined logical channel, the BSR, or the scheduling request, and transmit a confirmation message for the configuration message.

* * * * *